(12) United States Patent
Hahn et al.

(10) Patent No.: US 6,646,066 B2
(45) Date of Patent: Nov. 11, 2003

(54) RUBBER COMPOSITION CONTAINING A THERMOPLASTIC POLYMER AND TIRE SIDEWALL COMPONENT OR TIRE SUPPORT RING COMPRISED OF SUCH RUBBER COMPOSITION

(75) Inventors: Bruce Raymond Hahn, Hudson, OH (US); Ivan Glen Hargis, Tallmadge, OH (US); David Andrew Benko, Munroe Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/098,080

(22) Filed: Mar. 14, 2002

(65) Prior Publication Data

US 2003/0176601 A1 Sep. 18, 2003

(51) Int. Cl.$^7$ ............................................. C08F 283/08
(52) U.S. Cl. ................ 525/539; 525/331.9; 525/333.1; 525/534; 525/535; 525/537; 524/492; 524/495
(58) Field of Search ............................. 525/331.9, 333.1, 525/539, 534, 535, 537; 524/495, 492

(56) References Cited

U.S. PATENT DOCUMENTS

| | | | | |
|---|---|---|---|---|
| 4,164,493 A | * | 8/1979 | Cooper et al. | 260/42.18 |
| 5,017,660 A | * | 5/1991 | Hattori et al. | 525/338 |
| 5,153,076 A | * | 10/1992 | Jadamus et al. | 428/521 |
| 5,198,050 A | * | 3/1993 | Gifford | 152/517 |
| 6,005,050 A | * | 12/1999 | Okada et al. | 525/68 |
| 6,012,498 A | * | 1/2000 | Koch | 152/197 |
| 6,169,146 B1 | * | 1/2001 | Okada et al. | 525/241 |
| 6,271,313 B1 | * | 8/2001 | Zambelli et al. | 525/242 |
| 6,376,598 B1 | * | 4/2002 | Wang | 524/508 |
| 6,448,327 B1 | * | 9/2002 | Braat et al. | 524/508 |

FOREIGN PATENT DOCUMENTS

| | | | | |
|---|---|---|---|---|
| EP | 0 810 263 A1 | * | 12/1997 | C08L/53/02 |
| JP | 8-269238 A | * | 10/1996 | C08L/7/00 |
| JP | 2002-307907 A | * | 10/2002 | B60C/1/00 |
| WO | WO 01/96476 A2 | * | 12/2001 | C08L/77/00 |

OTHER PUBLICATIONS

Abstract and translation (in English) for JP 8-269238.*

* cited by examiner

Primary Examiner—David W. Wu
Assistant Examiner—Rip A Lee
(74) Attorney, Agent, or Firm—Henry C. Young, Jr.

(57) ABSTRACT

This invention relates to rubber composition which contains a thermoplastic polymer and use thereof as a tire sidewall component and/or tread supporting ring for use in a tire/rim assembly. Such tire sidewall component may be a sidewall insert and/or apex of a rubber composition which contains a thermoplastic polymer.

20 Claims, No Drawings

RUBBER COMPOSITION CONTAINING A THERMOPLASTIC POLYMER AND TIRE SIDEWALL COMPONENT OR TIRE SUPPORT RING COMPRISED OF SUCH RUBBER COMPOSITION

FIELD OF THE INVENTION

This invention relates to a rubber composition which contains a thermoplastic polymer and use thereof as a tire sidewall component and/or tread supporting ring for use in a tire/rim assembly. Such tire sidewall component may be a sidewall insert and/or apex of a rubber composition which contains a thermoplastic polymer.

BACKGROUND OF THE INVENTION

Pneumatic tires conventionally contain a relatively hard rubber sidewall insert in the nature of an apex as an insert within a tire's sidewall adjacent to, and usually juxtapositioned to, a tire's bead portion to aid in controlling the stiffness of the tire's sidewall.

For some tires, particularly tires which are intended to be able to run with only atmospheric air pressure within the pneumatic tire cavity, a relatively hard rubber insert is positioned in the tire sidewall which may be spaced apart from the bead portions in order to add support as well as stiffness to the tire sidewall.

Such insert-containing sidewall, because of a usual inherent increased thickness of the sidewall itself, an inherent increase in heat generation is typically experienced which results in an increased running temperature for the tire sidewall during its operation of moving its associated vehicle.

The invention relates to use of an inclusion of a particular thermoplastic polymer in such rubber sidewall inserts to reduce heat generation within the rubber insert while substantially maintaining its compression modulus.

The invention also relates to a tread support ring in a tire/rim assembly comprised of a rubber composition which contains an inclusion of a thermoplastic polymer to aid in reducing heat generation.

In the description of this invention, the term "phr" is used to designate parts by weight of a material per 100 parts by weight of elastomer. The terms "rubber" and "elastomer" may be used interchangeably unless otherwise indicated. The terms "vulcanized" and "cured" may be used interchangeably, as well as "unvulcanized" or "uncured", unless otherwise indicated.

SUMMARY AND PRACTICE OF THE INVENTION

In accordance with this invention, a rubber composition containing a thermoplastic polymer is provided which comprises at least one diene-based elastomer and an inclusion therein of said thermoplastic polymer is provided which comprises, based upon 100 phr of elastomer:

(A) 100 phr of a diene-based elastomer, and (B) about 5 to about 20, alternately about 5 to about 10, phr of particulate thermoplastic material dispersed therein selected from at least one of polyphenylene ether, polyphenylene sulfide and syndiotactic polystyrene, (C) about 20 to about 100, alternately about 25 to about 90, phr of at least one reinforcing particulate filler selected from carbon black, aggregates of synthetic amorphous silica and silica-containing carbon having domains of silica on its surface, and (D) a coupling agent having a moiety reactive with hydroxyl groups (e.g. silanol groups) contained on the surface of said precipitated silica and said silica domains on the surface of said silica-containing carbon black and another moiety interactive with at least one of said elastomers.

In further accordance with this invention, a tire is provided having an insert within its sidewall comprised of said elastomer having said inclusion therein of said thermoplastic polymer.

In additional accordance with this invention a tire/rim assembly is provided comprised of a pneumatic tire mounted on a rigid rim to form a cavity therebetween (generally confined by the cavity of said pneumatic tire and said rim), wherein said rim contains a tire tread supportable ring mounted thereon and within said cavity, wherein said ring is comprised of said rubber composition which contains an said inclusion therein of said thermoplastic polymer.

In said tire sidewall, said insert may be in a form of an apex in juxtaposition to one or more tire tread component or may be spaced apart from said bead portion to a position closer to the tire tread.

In said tire/rim assembly, said tread supporting ring is typically mounted on the tire rim within the pneumatic tire envelope, or toriodal cavity, in a manner to not normally contact the tire carcass in the crown region of the tire beneath the tire tread, but to contact and thereby support the tire when the tire looses its inflation pressure to keep the tire from going flat.

In practice the tire is a substantially open toroidaly shaped pneumatic rubber tire comprised of a carcass which supports a circumferential tread designed to be ground contacting and which contains two spaced apart, relatively inextensible bead portions, and two sidewall portions which individually extend from each of said bead portions to the tire tread;

wherein said carcass is comprised of at least one carcass ply extending from bead to bead, and optionally at least one belt ply extending circumferentially around said carcass and positioned between said tread and said carcass plies;

wherein said carcass plies and belt plies are individually comprised of a laminate of a rubber composition and a plurality of spaced apart cords disposed in a substantially parallel relationship to each other, wherein said rubber composition encapsulates said cords, and wherein said cords are comprised of one or more filaments, wherein said filaments are selected from brass coated steel filaments, polyester filaments, nylon filaments, aramid filaments and glass filaments;

wherein said carcass contains (A) an apex as a strip of a rubber composition in a shape of an annular ring positioned within a carcass sidewall adjacent to a bead portion of the carcass in a primary annular direction circumferentially co-extensive within the sidewall portion of the carcass and a secondary radial direction extending toward and spaced apart from the tire tread, and/or;

(B) a sidewall insert as a strip of said rubber composition which contains an inclusion of said thermoplastic polymer, in a shape of an annular ring positioned within a carcass sidewall and spaced apart from a carcass bead portion in a primary annular direction circumferentially co-extensive within the sidewall portion of the carcass and a secondary radial direction extending toward and spaced apart from the tire tread.

Coupling agents for said rubber composition which contains an inclusion of said thermoplastic polymer and silica and/or carbon black which contains silica domains on its surface, may include, for example, bis(3-trialkoxysilylalkyl) polysulfides, such as, for example, a bis(3-trioxysilylpropyl) polysulfide, having an average of from about 2 to about 2.6 or from 3.5 to about 4, connecting sulfur atoms in its polysulfidic bridge, preferably from 2 to 2.6 connection sulfur atoms.

The polyphenylene oxide material may be a poly(2,6-dimethyl-p-phenylene) ether obtained as Vistoran™ 1900 from the Creanova Company and blended with polystyrene polymers.

The polyphenylene sulfide material may be Ryton™ from the Phillips Petroleum Company.

The syndiotactic polystyrene may contain a small amount of co-polymerized p-methylstyrene and obtained as Questra™ from the Dow Chemical Company.

A significant aspect of is this invention is the reduction of heat generation in the rubber composition which contains a dispersion of such polymers.

In practice, for the purposes of this invention, said thermoplastic polymer is homogeneously dispersed in its elastomer host by mixing at a temperature in a range of about 100° C. to about 175° C. and under conditions sufficient to break down the elastomer and disperse the thermoplastic polymer therein.

In practice, various diene-based elastomers may be used for the tire component (e.g. tire tread) such as, for example, polymers of isoprene and/or 1,3-butadiene and copolymers of styrene with isoprene and/or 1,3-butadiene.

Representative of such conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin and/or silica coupled elastomers may also be used, such as, for example, tin and/or silica coupled organic solution polymerization prepared styrene/butadiene co-polymers, isoprene/butadiene copolymers, styrene/isoprene copolymers, polybutadiene and styrene/isoprene/butadiene terpolymers. Such coupled elastomers may be prepared, for example, by organic solvent polymerization in the presence of a suitable tin-based or silicon-based catalyst complex of at least one of isoprene and 1,3-butadiene monomers or of styrene together with at least one of isoprene and 1,3-butadiene monomers. The preparation of tin and silicon coupled elastomers via organic solvent polymerization is well known to those having skill in such art.

In practice, the rubber composition may contain a functionalized diene-based elastomer. For example, a functionalized elastomer may be provided as a diene-based elastomer as described above which contains one or more functional groups such as, for example, one or more groups selected from hydroxyl groups, carboxyl groups, silanol groups, amine groups and epoxy groups, which are available to participate in reactions with, for example rubber reinforcing fillers such as, for example, carbon black (actually moieties such as for example minor amounts of carboxyl groups on the surface of carbon black), carbon black which contains domains of silica on its surface, amorphous silica (which contains, for example, silanol groups on its surface), clay (particularly water swellable clay such as for example montmorillonite clay), and starch-based reinforcement. Such functionalized diene-based elastomers, and their preparation, are well known to those having skill in such art.

In the further practice of this invention, particulate reinforcement for the rubber composition may also include aggregates of synthetic amorphous silica, or a combination of carbon black and such precipitated silica, usually of an amount in a range of about 35 to about 100 alternately about 35 to about 90, phr. If a combination of such carbon black and precipitated silica is used, usually at least about 5 phr of carbon black and at least 10 phr of silica are used. For example, a weight ratio of silica to carbon black ranging from about 1/5 to 5/1 might be used.

The precipitated silica aggregates preferably employed in this invention are precipitated silicas such as, for example, those obtained by the acidification of a soluble silicate, e.g., sodium silicate and may include coprecipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 $cm^3/100$ g, and more usually about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from Degussa AG with, for example, designations VN2 and VN3, as well as other grades of silica, particularly precipitated silicas, which can be used for elastomer reinforcement.

For the coupling agent, for example, a bis(3-trialkoxysilylalkyl) polysulfide having an average of 2 to 2.6 or of 3.5 to 4 connecting sulfur atoms in its polysulfide bridge may be used such as for example a bis(3-triethoxysilylpropyl) polysulfide.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to the utilization a heat resistant thermoplastic material in a tire sidewall insert rubber composition.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and fillers such as silica and silica treated carbon black and adhesive agent, are mixed in one or more non-productive mix stages. The terms "non-productive" and "productive" mix stages are well known to those having skill in the rubber mixing art.

The following examples are presented to illustrate the invention and are not intended to be limiting. The parts and percentages are by weight unless otherwise designated.

EXAMPLE I

A series of six rubber based compositions were prepared which are referred to herein as Samples A through F, with Sample A being a Control Sample.

Control Sample A is prepared without an addition of a heat resistant thermoplastic material.

Sample B contained 5 phr of polyphenylene ether as an alloy with polystyrene.

Sample C contained 5 phr of syndiotactic polystyrene.

Sample D contained 20 phr of syndiotactic polystyrene (an increase of 15 phr) was used in order to replace an equivalent amount of carbon black.

Sample E contained 5 phr of polyphenylene sulfide.

Sample F contained 20 phr of polyphenylene sulfide (an increase of 15 phr) in order to replace an equivalent amount of carbon black.

For this Example, in what is usually referred as a non-productive mixing procedure, the Samples were prepared by first adding the natural rubber (cis 1,4-polyisoprene) to an internal rubber mixer which had been preheated to a temperature of about 110° C. and first mixing the rubber therein for about 30 seconds minutes to slightly break down the rubber and reduce its viscosity, following which the heat resistant thermoplastic material, where applicable, and other indicated ingredients, except for sulfur and associated sulfur vulcanization accelerators, were mixed with the elastomer to a temperatures of about 156° C., 165° C., 165° C., 167° C., 168° C., and 166° C., respectively, after which the mixture is removed from the rubber mixer, open roll milled, sheeted out and cooled to a temperature below 40° C.

The resulting rubber mixtures were re-mixed in an internal rubber mixer to a temperature of about 145° C., removed from the mixer, milled, sheet out and cooled to a temperature below 40° C.

In what is usually referred to a subsequent mixing step, usually referred to as a productive mixing step, the mixture is introduced into an internal rubber mixer and sulfur and vulcanization accelerators are added and mixed for about four minutes to a temperature of about 100° C.

Compositions of Samples A through E are represented in the following Table 1.

TABLE 1

| | Parts | | | | | |
|---|---|---|---|---|---|---|
| Material | Control Sample A | Sample B | Sample C | Sample D | Sample E | Sample F |
| First Non-Productive Mixing Step | | | | | | |
| Natural rubber | 80 | 80 | 80 | 80 | 80 | 80 |
| Cis 1,4-polybutadiene rubber[1] | 20 | 20 | 20 | 20 | 20 | 20 |
| Carbon black[2] | 60 | 606 | 60 | 45 | 60 | 45 |
| Processing oil[3] | 4 | 4 | 4 | 4 | 4 | 4 |
| Zinc oxide | 8 | 8 | 8 | 8 | 8 | 8 |
| Polyphenylene ether[4] | 0 | 5 | 0 | 0 | 0 | 0 |
| Syndiotactic Polystyrene[5] | 0 | 0 | 5 | 20 | 0 | 0 |
| Polyphenylene sulfide[6] | 0 | 0 | 0 | 0 | 5 | 20 |
| Stearic acid | 1 | 1 | 1 | 1 | 1 | 1 |
| Productive Mixing Step | | | | | | |
| Accelerator(s)[7] | 1.25 | 1.25 | 1.25 | 1.25 | 1.25 | 1.25 |
| Sulfur | 4 | 4 | 4 | 4 | 4 | 4 |

[1]Obtained from The Goodyear Tire & Rubber Company
[2]N660, an ASTM designation
[3]Of the naphthenic type rubber processing oil
[4]Obtained as Vestoran ™ 1900 from the Creanova Company
[5]Obtained as Questra ™ from the Dow Chemical Company
[6]Obtained as polyphenylene sulfide from the Aldrich Chemical Company
[7]Of the sulfonamide type
[9]Of the phthalimide type Various physical properties of the Samples of Table 1 are reported in the following Table 2.

In the following Table 2 the terms "UTS" and "MTS" mean "Ultimate Tensile System" and "Materials Testing System", respectively.

TABLE 2

| Properties | Control Sample A | Sample B | Sample C | Sample D | Sample E | Sample F |
|---|---|---|---|---|---|---|
| UTS Modulus/Tensile/Elongation Compression Modulus (cure at 150° C. for 18 minutes) | | | | | | |
| 15% elongation, MPa | 1.48 | 1.711 | 1.733 | 1.521 | 1.654 | 1.668 |
| 30% elongation, MPa | 3.487 | 4.090 | 4.107 | 3.704 | 3.896 | 3.917 |
| Ultimate tensile strength (MPa) | 13.95 | 10.89 | 13.63 | 8.81 | 15.53 | 12.03 |
| Ultimate elongation (%) | 204 | 154 | 199 | 195 | 221 | 236 |
| MTS (cure at 150° C. for 18 minutes) E' at 2% compressive strain[1] (N/mm) | | | | | | |
| 100° C. | 13.2 | 14.9 | 14.6 | 13.4 | 14.6 | 12.1 |
| 150° C. | 12.7 | 14.9 | 14.2 | 13.1 | 14.5 | 12.8 |
| 200° C. | 9.0 | 8.7 | 9.0 | 7.7 | 9.1 | 7.7 |
| Tan Delta at 2% compressive strain[2] | | | | | | |
| 100° C. | 0.068 | 0.067 | 0.068 | 0.049 | 0.065 | 0.047 |
| 150° C. | 0.060 | 0.055 | 0.060 | 0.041 | 0.050 | 0.041 |
| 200° C. | 0.085 | 0.108 | 0.085 | 0.070 | 0.086 | 0.081 |
| Hf (Relative Heat Generation at Constant Force) | | | | | | |
| 100° C. | 41.3 | 47.2 | 46.8 | 33.5 | 44.6 | 27.9 |
| 150° C. | 36.1 | 38.7 | 39.9 | 27.7 | 35.5 | 27 |
| 200° C. | 33.3 | 38.3 | 33.4 | 24.7 | 34.7 | 28.5 |

[1]The E' value at 2 percent compressive strain, namely a measure of compressive Storage Modulus, as is well known to those having skill in such art, is considered herein to be a measure of stiffness, wherein an increase of E' is a corresponding indication of an increase in stiffness of the rubber composition.
[2]The Tan Delta at 2 percent compressive strain, namely a ratio of compressive Loss Modulus to Storage Modulus, as is well known to those having skill in such art, is considered herein to be a measure of hysteresis wherein a lower hysteresis is desirable which is predictive of lower heat generation, and thus a lower rate of temperature buildup, within the respective component of a tire sidewall component, tread supportingring of a tire/rim assembly, during working conditions. A decrease in the Tan Delta value at 100° C., is a corresponding indication of a decrease in hysteresis of the rubber composition.

It can be seen from Table 2 that Samples D, E and F resulted in lower tan delta values, as compared to Control Sample A and therefore have predictably less heat generation during working conditions for a respective tire sidewall component or a tread-supporting ring in a tire/rim assembly under working conditions.

This is considered herein to be significant because lower heat generation results in a lower rate of temperature rise a tire component which, in turn, is predictive of a longer lasting component under working conditions, particularly where the component is a tire sidewall insert of tread-supporting ring of a tire/rim assembly.

It can also be seen from Table 2 that Samples B, C, D, E and F resulted in higher modulus values, as compared to Control Sample A which is indicative of a stiffer tire component, particularly where the component is a sidewall insert or tread-supporting ring in a tire/rim assembly.

This is significant because it is considered herein that a tire running in an underinflated state requires a stiff support in its sidewall and for a tread-supporting ring in a tire/rim assembly.

While various embodiments are disclosed herein for practicing the invention, it will be apparent to those skilled in this art that various changes and modifications may be made therein without departing from the spirit or scope of the invention.

What is claimed is:

1. A pneumatic tire having at least one component composed of at least one of:
   (A) a sidewall insert within its sidewall, wherein said sidewall insert is in a shape of an annular ring positioned within its sidewall; and
   (B) a tread supportable ring positioned within a cavity of a tire/wheel assembly wherein said tire/wheel assembly is comprised of said tire mounted on a rigid metal rim to form said cavity and wherein said rim contains said tread supportable ring mounted thereon and within said cavity;

wherein said component is a rubber composition comprised of at least one diene-based elastomer which contains an inclusion therein of a particulate thermoplastic polymer, based upon parts by weight per 100 parts by weight of said elastomer (phr):
   (A) 100 phr of a diene-based elastomer(s), and
   (B) about 5 to about 20 phr of said particulate thermoplastic polymer dispersed therein selected from at least one of polyphenylene ether, polyphenylene sulfide and syndiotactic polystyrene or mixtures thereof,
   (C) about 20 to about 100 phr of at least one reinforcing particulate filler selected from the group consisting of carbon black, aggregates of synthetic amorphous silica and silica-containing carbon having domains of silica on its surface, and
   (D) a coupling agent having a moiety reactive with hydroxyl groups contained on the surface of said aggregates of synthetic amorphous silica and said silica domains on the surface of said silica-containing carbon black and another moiety interactive with at least one of said elastomers.

2. The tire of claim 1 wherein said component is said tread supportable ring.

3. The tire of claim 1 wherein said thermoplastic polymer is a polyphenylene ether.

4. The tire of claim 1 wherein said thermoplastic polymer is a polyphenylene sulfide.

5. The tire of claim 1 wherein said thermoplastic polymer is a syndiotactic polystyrene.

6. The tire of claim 1 wherein said component is said sidewall insert in a form of an apex in juxtaposition to a tire bead portion.

7. The tire of claim 1 wherein said component is said sidewall insert and said sidewall insert is in a shape of an annular ring positioned within a carcass sidewall spaced apart from a carcass bead portion in a primary annular direction circumferentially co-extensive within the sidewall portion of the carcass and a secondary radial direction extending toward and spaced apart from the tire tread.

8. The tire of claim 1 wherein said diene-based elastomer(s) is comprised of at least one of natural cis 1,4-polyisoprene, synthetic cis 1,4-polyisoprene, cis 1,4-polybutadiene, styrene/butadiene copolymers, medium vinyl polybutadiene having a vinyl 1,2-content in a range of about 15 to about 90 percent, isoprene/butadiene copolymers, styrene/isoprene/butadiene terpolymers and tin coupled elastomers selected from at least one of tin coupled organic solution prepared styrene/butadiene co-polymers, isoprene/butadiene copolymers, styrene/isoprene copolymers, polybutadiene and styrene/isoprene/butadiene terpolymers.

9. The tire of claim 1 wherein said rubber composition contains an elastomer as a tin and/or silicon coupled organic solution polymerization prepared styrene/butadiene copolymer, isoprene/butadiene copolymer, styrene/isoprene copolymer, polybutadiene or styrene/isoprene/butadiene terpolymer or mixtures thereof.

10. The tire of claim 1 wherein at least one of said diene-based elastomer(s) is a functionalized elastomer which contains one or more functional groups selected from the group consisting of hydroxyl groups, carboxyl groups, silanol groups, amine groups and epoxy groups, which are available to participate in reactions with rubber reinforcing fillers selected from the group consisting of carbon black, carbon black containing domains of silica on its surface, and amorphous silica.

11. The tire of claim 1 wherein said component is said sidewall insert.

12. The tire of claim 1 wherein said rubber composition of said tire component also contains at least one of the group consisting of montmorillonite clay and starch-based reinforcement.

13. The tire of claim 11 wherein said thermoplastic polymer is a polyphenylene ether.

14. The tire of claim 11 wherein said thermoplastic polymer is a polyphenylene sulfide.

15. The tire of claim 11 wherein said thermoplastic polymer is a syndiotactic polystyrene.

16. The tire of claim 11 wherein said diene-based elastomer(s) is comprised of at least one of natural cis 1,4-polyisoprene, synthetic cis 1,4-polyisoprene, cis 1,4-polybutadiene, styrene/butadiene copolymers, medium vinyl polybutadiene having a vinyl 1,2-content in a range of about 15 to about 90 percent, isoprene/butadiene copolymers, styrene/isoprene/butadiene terpolymers and tin coupled elastomers selected from at least one of tin coupled organic solution prepared styrene/butadiene co-polymers, isoprene/butadiene copolymers, styrene/isoprene copolymers, polybutadiene and styrene/isoprene/butadiene terpolymers.

17. The tire of claim 11 wherein said rubber composition contains a diene based elastomer(s) as a tin and/or silicon coupled organic solution polymerization prepared styrene/butadiene copolymer, isoprene/butadiene copolymer, styrene/isoprene copolymer, polybutadiene or styrene/isoprene/butadiene terpolymer or mixtures thereof.

18. The tire of claim 11 wherein at least one of said diene-based elastomer(s) is a functionalized elastomer which contains one or more functional groups selected from the group consisting of hydroxyl groups, carboxyl groups, silanol groups, amine groups and epoxy groups, which are available to participate in reactions with rubber reinforcing fillers selected from the group consisting of carbon black, carbon black containing domains of silica on its surface and amorphous silica.

19. The tire of claim 2 wherein said diene-based elastomer(s) is comprised of at least one of natural cis 1,4-polyisoprene, synthetic cis 1,4-polyisoprene, cis 1,4-polybutadiene, styrene/butadiene copolymers, medium vinyl polybutadiene having a vinyl 1,2-content in a range of about 15 to about 90 percent, isoprene/butadiene copolymers, styrene/isoprene/butadiene terpolymers and tin coupled elastomers selected from at least one of tin coupled organic solution prepared styrene/butadiene co-polymers, isoprene/butadiene copolymers, styrene/isoprene copolymers, polybutadiene and styrene/isoprene/butadiene terpolymers and wherein at least one of said diene-based elastomers is a functionalized elastomer which contains one or more of functional groups selected from the group consisting of hydroxyl groups, carboxyl groups, silanol groups, amine groups and epoxy groups, which are available to participate in reactions with rubber reinforcing fillers selected from the group consisting of carbon black, carbon black containing domains of silica on its surface.

20. The tire of claim 6 herein said diene-based elastomer(s) is comprised of at least one of natural cis 1,4-polyisoprene, synthetic cis 1,4-polyisoprene, cis 1,4-polybutadiene, styrene/butadiene copolymers, medium vinyl polybutadiene having a vinyl 1,2-content in a range of about 15 to about 90 percent, isoprene/butadiene copolymers, styrene/isoprene/butadiene terpolymers and tin coupled elastomers selected from at least one of tin coupled organic solution prepared styrene/butadiene co-polymers, isoprene/butadiene copolymers, styrene/isoprene copolymers, polybutadiene and styrene/isoprene/butadiene elastomer which contains one or more of functional groups selected from the group consisting of hydroxyl groups, carboxyl groups, silanol groups, amine groups and epoxy groups, which are available to participate in reactions with rubber reinforcing fillers selected from the group consisting of carbon black, carbon black containing domains of silica on its surface.

* * * * *